United States Patent
Kools et al.

(10) Patent No.: US 7,560,024 B2
(45) Date of Patent: Jul. 14, 2009

(54) METHOD AND SYSTEM FOR CONTROLLING PORE SIZE OF MICROPOROUS PHASE INVERSION MEMBRANES

(75) Inventors: Willem Franciscus Catherina Kools, Winchester, MA (US); Ronald Tuccelli, Winchester, MA (US); Gabriel Tkacik, Bedford, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 10/419,492

(22) Filed: Apr. 21, 2003

(65) Prior Publication Data
US 2003/0214066 A1 Nov. 20, 2003

(51) Int. Cl.
*B01D 71/00* (2006.01)
*B01D 61/00* (2006.01)

(52) U.S. Cl. ............... 210/500.22; 210/500.21; 264/40.1; 264/41; 264/184; 264/212; 366/336; 427/245; 427/246

(58) Field of Classification Search ............ 210/500.21, 210/500.22; 264/40.1, 41, 184, 212; 366/336
See application file for complete search history.

(56) References Cited

U.S. PATENT DOCUMENTS

| | | | |
|---|---|---|---|
| 4,208,848 A | 6/1980 | Kohl | |
| 4,340,479 A | 7/1982 | Pall | |
| 4,428,776 A * | 1/1984 | Li | 106/122 |
| 4,663,050 A * | 5/1987 | Li et al. | 210/649 |
| 4,707,266 A | 11/1987 | Degen et al. | |
| 4,770,777 A | 9/1988 | Steadly et al. | |
| 4,963,266 A * | 10/1990 | Morgan et al. | 210/640 |
| 5,215,662 A | 6/1993 | Johnson et al. | |
| 5,444,097 A | 8/1995 | Tkacik | |
| 5,736,051 A | 4/1998 | Degen et al. | |
| 5,746,917 A * | 5/1998 | Altmeier | 210/500.37 |
| 6,056,529 A | 5/2000 | Meyering et al. | |
| 6,126,826 A * | 10/2000 | Pacheco et al. | 210/500.42 |
| 6,776,940 B2 * | 8/2004 | Meyering et al. | 264/45.9 |

* cited by examiner

Primary Examiner—Krishnan S Menon

(57) ABSTRACT

This invention provides for a method to control the pore size or bubble point of porous membranes made by phase inversion in a continuous manufacturing process by blending two or more solutions each capable of producing a porous membrane with different pore size or bubble point than the pore size or bubble point of the desired membrane, and blending these solutions by the method of this invention to produce the desired pore size or bubble point. This invention also provides for a method to monitor membrane pore size in a continuous process and adjust pore size during the continuous manufacturing process.

20 Claims, 2 Drawing Sheets

METHOD AND SYSTEM FOR CONTROLLING PORE SIZE OF MICROPOROUS PHASE INVERSION MEMBRANES

This invention relates to a method of producing porous structures and porous membranes. More particularly, the invention relates to a method of producing microporous membranes from blended polymer solutions, and the membranes so produced.

BACKGROUND OF THE INVENTION

Microporous membranes are used in a wide variety of applications. Used as separating filters, they remove particles and bacteria from diverse solutions such as buffers and therapeutic containing solutions in the pharmaceutical industry, ultrapure aqueous and organic solvent solutions in microelectronics wafer making processes, removing bacteria from food and beverage products and for pre-treatment of water purification processes. In addition, they are used in medical diagnostic devices, where their high porosity results in advantageous absorption and wicking properties.

Microporous membranes have a continuous porous structure that extends throughout the membrane. Workers in the field consider the range of pore sizes to be from approximately 0.02 micron to approximately 10.0 microns.

Microporous membranes are described as symmetric or asymmetric. Symmetric membranes have a porous structure with a pore size distribution characterized by an average pore size that is substantially the same throughout the thickness of the membrane. In asymmetric membranes, the average pore size varies through the membrane, in general, increasing in size from one surface to the other. Other types of asymmetry are known. For example, those in which the pore size goes through a minimum pore size at a position within the thickness of the membrane.

Microporous membranes based on semi-crystalline and glassy polymers have been previously prepared. Most of the commercial membranes of these polymers are symmetric in nature. The production of such microporous membranes are described, for example, in U.S. Pat. Nos. 4,208,848 and 5,736,051 for PVDF and in U.S. Pat. Nos. 4,340,479, 4,707, 266, 6,056,529, 4,770,777 and 5,215,662 for polyamide membranes. These preparations are generally described to consist of the following steps:

preparation of a specific and well controlled polymer solution, the casting solution, comprising a polymer, and a solvent system. In many cases two polymers are used, where one polymer is used to provide strength or other mechanical properties, and the second polymer is used to provide a functional benefit, such as hydrophilicity. The solvent system comprises a solvent and optionally, one or more additives, usually non-solvents or swelling agents for the polymer or polymers;

casting, i.e., coating, a relatively thin layer of the polymer solution onto a temporary substrate;

immersing and coagulating the resulting film of the polymer solution in a nonsolvent;

removing the temporary substrate and drying the resulting microporous membrane.

In some manufacturing processes, a permanent reinforcing web, such as a nonwoven fabric, is used as the substrate. Removal of the temporary substrate in this instance is not required, as the reinforcing substrate becomes part of the overall structure.

A similar process involving extruding the polymer solution through a fiber spinneret with a lumen is used to make hollow fiber membranes.

Polyvinylidene fluoride (PVDF) membranes as described above are made by casting a PVDF solution into a specific coagulant (methanol) which allows the formation of a microporous, symmetric membrane. A similar process is used for symmetric polyamide membranes. In these prior art processes, the semi-crystalline polymers used primarily lead to symmetric membranes.

Representative semi-crystalline polymers include polyvinylidene fluoride, polyvinyl fluoride, polyvinyl chloride, polyvinylidene chloride, polyamides, commonly known as nylons, such as nylon 6, nylon 6,6, nylon 6,12, and nylon 4; aromatic polyamides such as polyphenylene terepthlamide, and cellulose esters, such as cellulose acetate.

Membranes made from such semi-crystalline polymers have a characteristic property whereby the thermal history of the polymer solution prior to casting has a dramatic effect on membrane performance. In general terms, it has been found that the higher the maximum temperature (Tmax) to which the solution is heated to, the larger the rated pore size of the resulting microporous membrane. In microporous membranes, pore size is related to the easily measured bubble-point.

Pore size usually refers to the ability of a porous media or membrane to filter material larger than a specified size from a fluid (be it gas or liquid). Put another way, pore size refers to a measure of the size of the passageways available for fluid passage or a measure of the diameter of the pores in a porous media or membrane. As a simple example, a membrane rated as "0.1 microns" would retain all material larger than 0.1 microns and pass all other material, including the solvent or fluid carrier that are smaller than 0.1 micron. Pore diameter can be described in by a variety of methods. Pore diameter can be specified as the diameter of the smallest particle or molecule that is retained by the porous media or membrane. When the porous structure of a porous media or porous membrane is analyzed by microscopy, pore diameter can be described as the diameter of the largest circle that can be inscribed in a pore, or by a hydraulic diameter, defined as one fourth the area of a pore divided by its circumference.

Pore size can be specified by a number of methods. Bubble point methods use the fact that to expel the liquid in a liquid-filled capillary requires a gas pressure dependent on capillary diameter to expel the liquid. The bubble point of a membrane is measured by applying a gas pressure to a liquid saturated membrane and gradually raising the gas pressure until the first gas bubble or stream of bubbles is observed rising from the side opposite that of the gas application side. The pressure at which the first bubbles appear on the opposite surface of the membrane is related to the largest pore size of that membrane. Bubble point is inversely related to pore size, with higher bubble points signifying smaller pore size of the membrane.

Filtration of various particles can be used to determine pore size. Colloidal gold particles, polystyrene latex particles, bacteria, viruses and dendrimers have all been used. The subject porous membrane is tested with various particles of known size, and the smallest particle that will not pass is used to give a pore size to the membrane. In another variation of such testing, a preset retention percentage of a particle of known size is used to rate pore size.

Soluble species can be used as well. The diameter of a soluble macromolecule is primarily dependent on molecular weight, and also on solution conditions. This diameter can be used to determine a pore size measure of porous media or membranes. Proteins, soluble polymers such as dextrans (polysaccharides), polyethylene oxides, and polyvinylpyrrolidone have been used for this purpose.

Microscopy can be used, with or without computerized image analysis, including scanning electron microscopy, transmission electron microscopy, and atomic force microscopy.

Scattering methods can be used. Light scattering, acoustic scattering, and neutron scattering methods have been described as methods to determine a measure of pore size.

Membrane manufacturers want to control pore size for reasons of product uniformity. For critical applications, such as sterile filtration, pore size cannot fall below a set minimum or above a set maximum and still have the desired retention and validation properties. Typically, one strives to form a product with a relatively small pore size distribution. The ability to rapidly adjust membrane properties during a continuous manufacturing process would allow manufacturers to bring their product within a narrower range of the desired properties.

In one method of controlling pore size, the polymer solution is made at a relatively low temperature in a typical manufacturing stirred tank vessel or similar device and then heated to the desired maximum temperature by, for example, a heated jacket. Practitioners skilled in the art are well aware that poor control over the final temperature, or maldistribution of temperature in a mixing vessel will result in membranes having bubble points that deviate from the desired bubble point. For this reason, close control of the final solution temperature, and the uniformity of the final temperature throughout the solution volume are highly desired.

Inconsistency in casting solution history can therefore cause reduced process yields. It can be appreciated that fine control over the thermal history of a large mass of viscous solution is difficult. As an alternative, in-line heating and cooling treatment is sometimes used in order to provide improved control over the thermal history of the polymer solution being processed. An in-line process provides a means for heating the solution as it is transported through a pipeline, thereby reducing the effective mass of solution being heated. The shorter heating contact time necessitated by in-line heating requires uniform local mixing to obtain even heat treatment and sophisticated process control to insure consistency of time and temperature during the entire casting process.

U.S. Pat. No. 6,056,529 describes a method using an inline heating system to heat a portion of a single batch solution being transported before casting a membrane. This method is limited to a single batch and is directed to reheating a portion of a prepared solution, with all the complications involved in closely controlling temperature.

These methods use fine control of polymer solution temperature to control membrane pore size. This requires bringing the polymer solution uniformly to within a few tenths of a degree of the desired temperature needed to attain the specified bubble point or pore size. These methods are limited to cases with solutions containing semi-crystalline polymers.

In contrast, the invention described herein can be used with any set of similar polymer solutions, chosen to bracket the desired final properties.

At least two solutions are used in the process of the present invention. The resulting pore size, or bubblepoint of each solution is known before full casting is done. Methods for this are explained in the Detailed Description. The inherent properties of the individual solutions are not changed, as by heating, prior to casting.

Furthermore, increasing temperature will tend to cause gas bubbles, due to the lower solubility of gases in liquids at higher temperatures. Gas bubbles are a source of defects in cast membranes and have to be removed before casting, adding to process complexity.

In a manufacturing situation, batches of polymer solution destined for membrane casting are sometimes made which are not exactly of the bubble point desired. This is usually determined by casting a test membrane from a portion of the solution batch. Rather than disposing of such batches, it would be economically useful, as well as environmentally beneficial, to be able to use such "off spec" batches. In the invention to be described, such batches can be made useful by selective in-line blending with a properly selected second batch to obtain the desired membrane pore size.

BRIEF DESCRIPTION OF THE INVENTION

This invention provides for a method to control the pore size or bubble point of porous membranes made by phase inversion in a continuous manufacturing process by blending two or more solutions each capable of producing a porous membrane with different pore size or bubble point than the pore size or bubble point of the desired membrane, and blending these solutions by the method of this invention to produce the desired pore size or bubble point.

In an embodiment of the present invention, the method provides two or more polymer solutions, each having had the pore size of the membrane that will result under the formation process. The ratio or proportions of each solution to be blended together to make a homogeneous manufacturing process polymer solution is calculated or determined and the two or more polymer solutions blended in the ratio or proportions calculated in an in-line blender. Membranes are then manufactured in the continuous process using the blended solutions In a further embodiment, the manufactured membrane, or a premanufacture test membrane is tested on-line or off-line and the results communicated to a real time feed back controller which adjusts the blend ratio or proportions to produce the desired pore size or bubble point.

In the embodiments, the polymer solutions are made using semicrystalline polymers. Representative semicrystalline polymers are polyvinylidene fluoride, polyvinyl fluoride, polyvinyl chloride, polyvinylidene chloride, polyamides, commonly known as nylons, such as nylon 6, nylon 6,6, nylon 6,12, and nylon 4; aromatic polyamides such as polyphenylene terepthlamide, and cellulose esters, such as cellulose acetate.

In the embodiments, the polymer solutions are made using polymers and solvent systems which produce solutions having a lower critical solution temperature. Representative polymers which can be used are aromatic polysulfones, including polyethersulfones, polyarylsulphones, polyphenylsulphones, polycarbonates, particularly bis-phenol A polycarbonates, polymethacrylates, polystyrenes, including substituted polystyrenes, and copolymers of the given classes.

DETAILED DESCRIPTION OF EMBODIMENTS OF THE INVENTION

Figure 1:
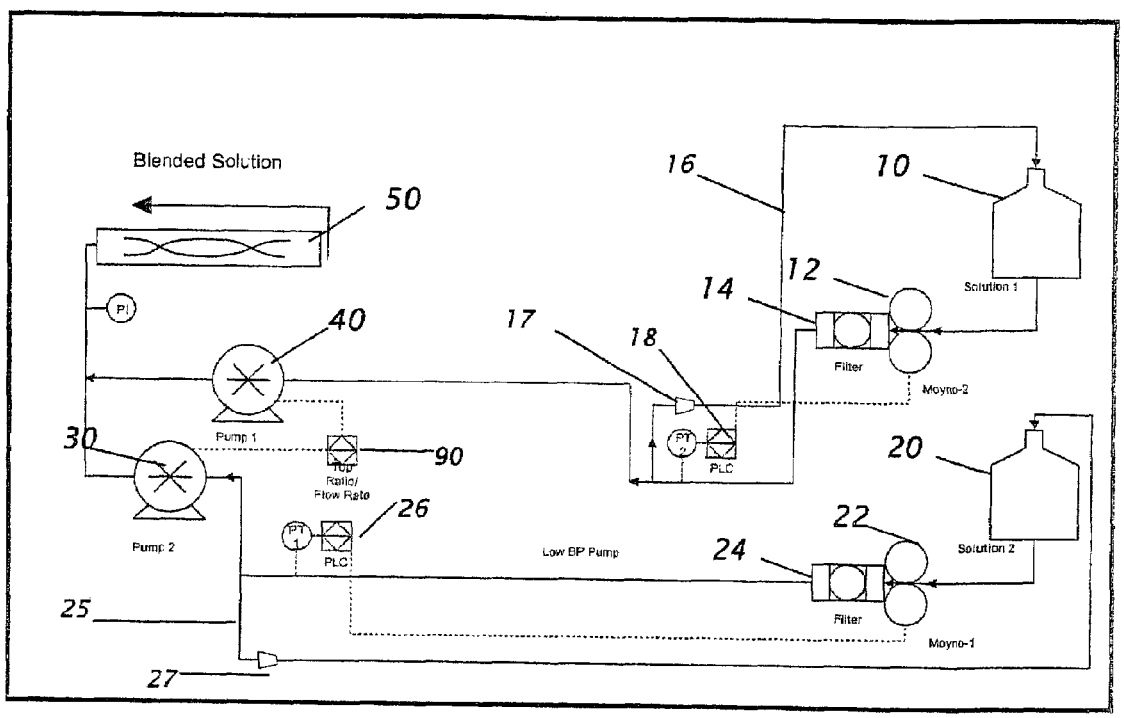
FIG. 1. shows a method of using the present invention to control pore size or bubble point FIG. 2. shows a method of adjusting pore size or bubble point in a continuous membrane manufacturing process.

The invention is a method of controlling the pore size of a porous membrane, typically a microporous membrane, more typically, a microporous membrane made from a solution of a semi-crystalline polymer, in a phase inversion process. The invention is directed to the case where a manufacturing process is specified, and it is desired to compensate for variations in polymer solution properties, whether purposely or inadvertently produced.

The invention provides for the process steps of;

providing two or more polymer solutions capable of making the desired membrane, but each with a different pore size, holding each solution in a separate vessel, determining the pore size that each membrane will produce if made by the specified manufacturing process, calculating or otherwise determining the ratio of the two or more solutions or the proportions of the two or more solutions, which, when combined, will produce a membrane with the desired properties, blending the two or more solutions in the proper ratio or proportions in a manner that affects the final solution properties only by the effect of the ratio or proportions, and not by the action of mixing or dissolution, for example by raising the solution temperature by the energy put into the solution by mixing or by any external heat source, manufacturing the membrane by the specified manufacturing process.

Optionally, the process can be used to feed back information from the manufacturing process by;

testing the manufactured membrane to determine the pore size, recalculating or otherwise redetermining the ratio of the two or more solutions or the proportions of the two or more solutions which when combined will produce a membrane with the desired properties, adjusting the blending of the two or more solutions to better obtain the desired membrane pore size, manufacturing membrane with the now adjusted blend.

In another embodiment, one batch solution can be used. In this case, the batch would provide two or more streams, each pumped at a controlled rate in a specified ratio of flow rates. One or more, preferably one, stream would be subjected to an in-line heating step to adjust the bubble point of that stream. The streams are then blended and processed to make a membrane as described above.

In the invention, at least two polymer solutions are used. The pore size of a membrane resulting from each solution made by the specified process is known or determined. To be used in the invention, the known or determined pore sizes must bracket the desired pore size of the final membrane to be manufactured.

In using the present invention, a practitioner will desire to manufacture a membrane having a specified pore size or bubble point. The practitioner can easily use or develop a correlation between the maximum temperature (Tmax) of the solution being used to manufacture the membrane and the pore size of the membrane made by the process being used to manufacture. The solution will comprise one or more polymers, solvent or solvent mixture, and any additives, designed to provide the desired pore size range. The correlation can be developed by generating data from multiple solutions made of the same composition, within the variance of the process being used, wherein each solution is heated to different maximum temperatures, and made into a membrane by the specified process. The membrane pore size of each solution can be measured by known pore size measurement means such as a bubble point test. From the known Tmax and the measured pore size, a correlation can be determined. Alternatively, multiple portions of a single solution can be heated to different Tmax values, made into membranes, and correlated as above.

With such correlations, a practitioner of this invention will know the resulting pore size of membranes made from any solution of this composition where the Tmax is known, when the membrane is made by the specified process.

The practitioner will use two or more solutions having bubble points which bracket the desired bubble point, that is, at least one solution higher and one lower. The practitioner will have previously developed a relationship between blend ratio, solution pore size or bubble points and solution pore size or bubble point of the final membrane. Alternatively, the practitioner can use a trial and effort method to find the proper blend ratio. In any event, knowing a starting point, the blend ratio will be set to make the desired membrane.

A practitioner can use solutions having a lower critical solution temperature (LCST). The use of such solutions to make porous membranes is described in U.S. Pat. No. 5,444,097. In the membranes disclosed by U.S. Pat. No. 5,444,097, pore size is controlled by the LCST of the polymer solution used to manufacture the membranes. LCST of the polymer solutions is a function of the composition of the polymer solution. By blending two or more polymer solutions of the same general composition, a practitioner can adjust the blended solution LCST in a manner similar to the semi-crystalline polymer solutions described above.

Representative polymers useful in LCST solutions are aromatic polysulfones, including polyethersulfones, polyarylsulphones, polyphenyisulphones, polycarbonates, particularly bis-phenol A polycarbonates, polymethacrylates, polystyrenes, including substituted polystyrenes, and copolymers of the given classes.

A practitioner can use a test membrane from a portion of each solution to determine the pore size and then mix the appropriate solution from the two or more solutions to obtain the desired pore size.

A practitioner can use correlations between pore size and solution viscosity, pore size and the percent polymer in the solution, measured either by weight or by volume, pore size and the complete composition of the solution, or any characteristic of the composition that can be analyzed and quantitated. Representative characteristics include, without being limited thereto, to the relative intensity of infrared or ultraviolet spectral peaks characteristic of one or more components of the solution, characteristic nuclear magnetic resonance peaks characteristic of one or more components of the solution, light scattering phenomena evidenced for example by Tyndal effects or turbidity.

From a knowledge of the pore size each solution will produce, the practitioner determines the ratio of the amounts of each solution that are needed to be blended to make a solution that will produce the membrane with the desired pore size. This determination can be a calculation based on previously developed relationships, such as linear or non-linear relationships between blend ratio, or the proportions of solutions capable of producing membranes of known pore size in the process being used and the desired final pore size. The determination can also be done directly or by interpolating from a look-up table of ratio and pore size developed from historical data. The determination can be also be done by trial and error testing of ratios or proportions to make sample membranes and thereby develop a useful correlation for the solutions being used.

Blending can be done by any method that does not change the final blended solution beyond those changes expected from simple physical blending. In practice, the solutions are pumped from the separate vessels at a controlled rate to a mixer. Rates can be controlled by the use of metering pumps, such as Zenith® pumps, or other controlled volume pumping means. Rates can be controlled by variable orifice control valves in methods well known in the engineering sciences. In a preferred method, a static mixer, such as a Kenics mixer (Chemineer®) or a SMX (Koch Glitsch®) is used to utilize a relatively small volume, in order to reduce introducing energy from a mechanical stirrer, which could change solution temperature and the resultant pore size. A static mixer is a pipe which contains sections of a helix which are joined at 90 degrees relative to the adjoining section, alternatingly left and right. Solution pumped from each solution holding vessel through the static mixer is folded and refolded many times to produce a homogeneous blend. In a preferred method, blending is done with minimal volume so as to reduce the time needed to adjust composition and attain a uniform solution with the adjusted flow rates. The mixer can be cooled to prevent temperature increase during the mixing and blending operation, but fine control of temperature is not required. Alternative mixers may also be used such as a Venturi mixer. Any mixer that does not adversely change the temperature of the solution may be used.

FIG. 1 illustrates an embodiment of the method for blending two solutions which are then transported to the membrane manufacturing process. (Not shown) Two solution containing vessels, 10 and 20 are operatively connected to feed pumps 12 and 22, which pump the respective solutions through in-line filters 14 and 24 to metering pumps 30 and 40. In the method illustrated in FIG. 1, the feed pumps are connected to programmable logic controllers 18 and 26 which control pump output and pressure to the metering pumps. Return lines 16 and 25 with a pressure relief valve 17 and 27 are shown for each stream. Feed pumps, such as Moyno Pumps (Springfield Ohio) and metering pumps such as Zenith Pumps sold by Zenith Pumps Div., Parker Hannifin Corporation of Sanford, N.C. are known in the art. Many types of in-line filters are known. The filter type used depends on solution properties, such as viscosity, solvent type, etc. Ratio flow controller 90 controls the ratio of flows from pump 30 and 40 to in-line blender 50. The ratio is set to produce the desired pore size or bubble point as discussed above. All or some of the system may have temperature control features such as cooling or warming jackets, cooling or warming coils and the like to maintain a relatively constant temperature.

Figure 2:
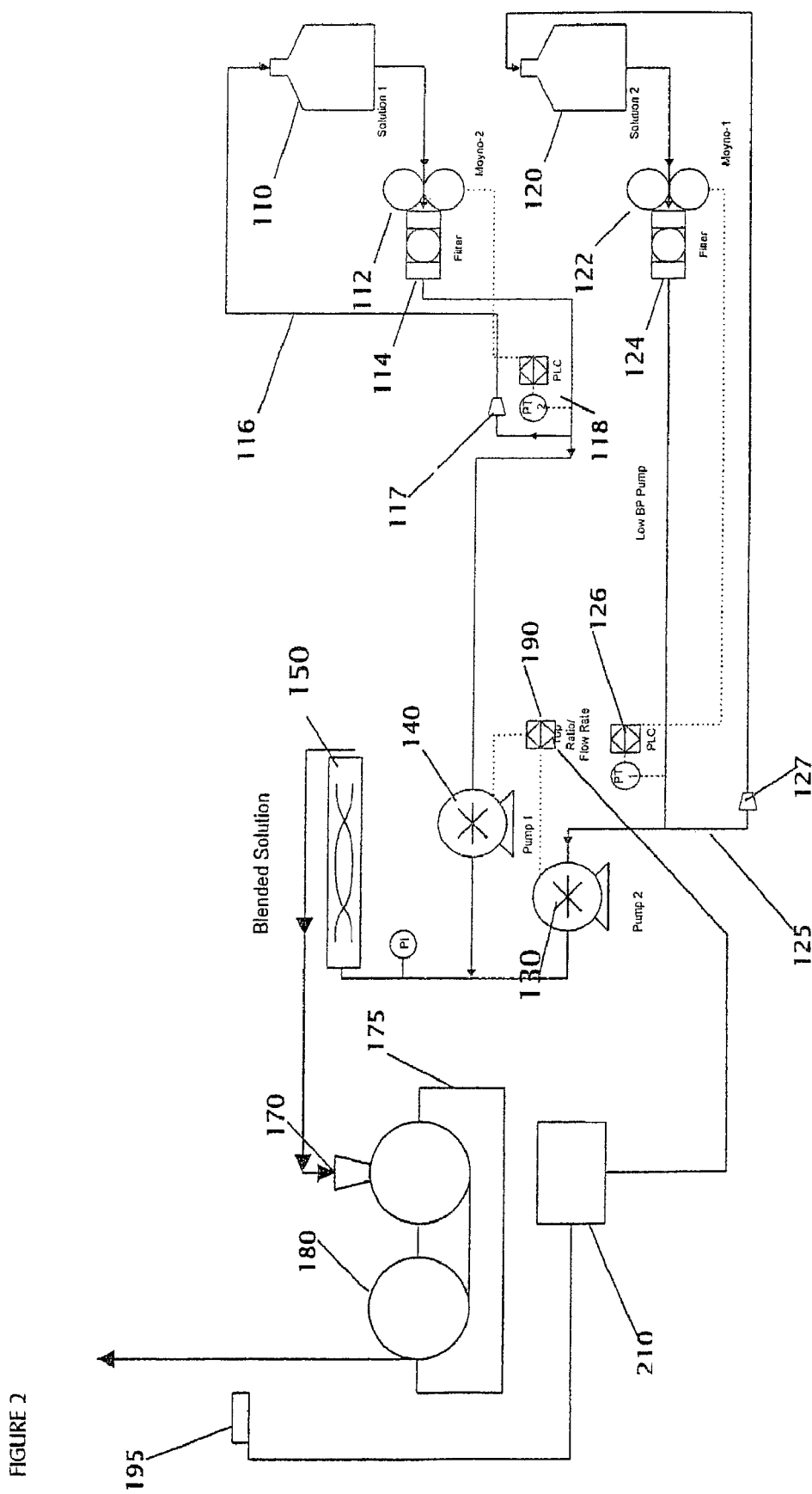

FIG. 2 illustrates the blending method of FIG. 1, coupled with a feedback process for online control and adjustment of membrane pore size or bubblepoint. Two solution containing vessels, 110 and 120 are operatively connected to feed pumps 112 and 122, which pump the respective solutions through in-line filters 114 and 124 to metering pumps 130 and 140. In the method illustrated in FIG. 1, the feed pumps are connected to programmable logic controllers 118 and 126 which control pump output and pressure to the metering pumps. Return lines 116 and 125 with a pressure relief valve 117 and 127 are shown for each stream. Feed pumps, such as Moyno Pumps (Springfield Ohio) and metering pumps such as Zenith pumps are known in the art. Many types of in-line filters are known. The type used depends on solution properties, such as viscosity, solvent type, etc. Ratio flow controller 190 controls the ratio of flows from pump 130 and 140 to in-line blender 150.

The blended solution is then further pumped to the membrane manufacturing process, shown in simplified form by coagulation bath 175, coating knife box 170 and immersion drums 180. In the process, solution is coated onto a continuous support web (not shown) by the knifebox 170. The support web is conducted into and through the coagulation bath 175 where the coagulant causes the membrane to form and solidify. The solidified membrane further travels out of the bath to other process steps, such as washing and drying.

At any point after the membrane has been formed, a means of measuring pore size, or a correlative function of pore size is applied, as shown by pore size measuring device 195. This is a contact or non-contact device that receives a signal from the membrane in response to a stimulating signal either from 195 or a separate source. The received signal is transmitted from 195 to signal transforming means 210, where it is transformed into an instruction signal and sent to ratio flow controller 190. Signal transforming means 210 can be a computer which uses a stored mathematical algorithm to transform the data signal from the pore size measuring device 195 to a code which is sent as an instruction to the ratio flow controller 190. For example, signal transforming means 210 could compare the signal to a database and determine the offset from the desired pore size or bubble point and calculate changes to the flow ratio which would adjust the pore size to a value closer to the desired value. Ratio flow controller 190 changes the flow ratio of the two streams to adjust pore size or bubble point in response to the coded instruction of signal transforming means 210.

One skilled in the art will appreciate that variations of this methods illustrated in FIGS. 1 and 2 are possible, depending on the requirements of the process. For example, the solutions can be fed directly to the metering pumps 30 and 40 by pressurizing the solution holding vessels, obviating the need for the feed pumps and associated equipment. In fact, in other possible embodiments, control valves could be substituted for the metering pumps. Other variations would be obvious to a skilled practitioner.

A practitioner can use a real time, on-line membrane characterization method at a suitable position on the continuous membrane manufacturing process line to instantly measure a membrane property or properties of interest and use this measurement to calculate or otherwise determine how to change the blend ratio or proportions to adjust for the difference between measured property or properties and desired property or properties. This can be done using a preprogrammed computer with a feedback loop to the blending process. The program would adjust valves controlling flow into the blend process. The smaller the volume of the blending vessel or static mixer is, the faster the response to changes in ratio or proportions. This has value to the manufacturer as it allows faster corrections and less waste during process correction.

Scattering methods, or electrical conductance or impedance are suitable methods of determining pore size in a real time, on-line process. Electrical methods are described in "Physical Review B"; 35(#11) 7283-7286, 1987, and 45(#1) 186-195, 1992.

A method using electrical impedance to measure pore size and tortuousity is given in (P. Fievet et al; J. Membrane Sci. 149 (1998) 143-150).

While one embodiment uses a temporary support on to which the blended two or more solutions are cast and coagulated, one can use a permanent support layer such as a woven or non-woven or porous cast structure as the support and incorporate that support structure into the final membrane structure. Suitable support layers include but are not limited to non-woven plastics such as TYPAR® fabrics available from E.I. DuPont de Nemours of Wilmington, Del., woven plastic or glass material or a porous membrane such as a stretched PTFE available from W.L. Gore & Associates of Newark, Del., a PVDF membrane such as DURAPORE® membrane available from Millipore Corporation or an ultra-high molecular weight polyethylene membrane available from Millipore Corporation.

The methods and systems above can be used on single layered membranes, such membranes formed into laminates, on composite membranes, on multiple layered membrane structures wherein the two or more layers are either sequentially cast upon each other or cocast upon each other and wherein at least one of the layers is formed by the above methods and systems.

EXAMPLES

A practitioner skilled in the art of developing and producing microporous membranes will be able to discern the advantages of the present invention. It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

Generic Process Description of Casting Process Used in Examples

In Examples 1-3, solutions of Kynar® 741 PVDF resin were made using N-methyl pyrrolidone as the solvent. Two solutions were used having different temperature histories. The two solutions were pumped at specified rates to produce a blend solution of desired proportion of each solution. The blended solution was coated onto a moving polyester film support at a thickness to produce a final membrane of about 80-85 microns thick. The coated film was immersed into a methanol bath for sufficient time to coagulate and solidify the membrane and remove the bulk of the solvent. The now-formed membrane was removed from the film, washed with water and dried.

Example 1

Two 20% PVDF-NMP solutions were made with the following Tmaxes: 47° C. creating a solution that would result in a low bubble point, approximately 10 psi, and 25° C. creating a solution with a bubble point of greater than 55 psi. Two membranes were made at a total thickness of 85 micron at two blend proportions. The isopropanol visual bubble points were as follows:

| Membrane | % 25° C. solution | Isopropanol (IPA) Bubble Point | Standard Deviation |
| --- | --- | --- | --- |
| 1 | 6.00 | 11.6 | 0.1 |
| 2 | 5.00 | 11.0 | 0.1 |

Example 2

Two 20% PVDF-NMP solution were made with the following Tmaxes: 47° C. creating a solution that had a low bubble point, approxiamately 10 psi bubble point and 25° C. creating a solution with a higher bubble point, greater than about 55 psi. Membranes were made with a small variation in the percentage of 25° C. solution at a total thickness of 85 micron. The isopropanol visual bubble points of the created membranes were as follows:

| Membrane | % of 25° C. solution | IPA Bubble Point |
| --- | --- | --- |
| 1 | 6.00 | 9.9 |
| 2 | 5.00 | 9.0 |
| 3 | 4.00 | 8.0 |
| 4 | 2.50 | 7.0 |

Example 3

Two 20% PVDF-NMP solution were made with the following Tmaxes: 40° C. creating a solution that would result in a low bubble point and 25° C. creating a solution with a high bubble point. Several membranes were made with a small variation in blend ratio at a total thickness of 80 micron. The isopropanol visual bubble points created were as follows:

| Membrane | Blend Ratio (40°/25°) | Average BP (psi) IPA | Standard Deviation |
| --- | --- | --- | --- |
| 1 | 95% | 51.7 | 0.6 |
| 2 | 10% | 15.0 | 0.0 |
| 3 | 5% | 14.7 | 0.6 |
| 4 | 2.5% | 10.7 | 0.6 |
| 5 | 2.5 | 11.0 | 0.0 |

Example 4

Two 20% PVDF-NMP solution were made with the following Tmaxes: 47° C. creating a solution that would result in a low bubble point and 25° C. creating a solution with a high bubble point. Cocast membranes were made with the blend ratio for the lower layer (85 micron) at a blending ratio of 5% of the lower Tmax solution resulting in a membrane bubble point of 11.0 (+/−0.1) when measured with isopropanol as wetting liquid in the test for this layer only. The blending ratio for the additional layer (35 micron) was varied as represented in the following table.

| Membrane | Blend Ratio (47°/25°) | Average BP (psi) IPA | Standard Deviation |
| --- | --- | --- | --- |
| 1 | 50.00 | 28.0 | 0.0 |
| 2 | 47.50 | 27.1 | 0.0 |
| 3 | 45.25 | 25.4 | 0.3 |
| 4 | 42.00 | 26.8 | 0.2 |
| 5 | 37.00 | 25.5 | 0.2 |
| 6 | 32.00 | 25.1 | 0.2 |
| 7 | 27.00 | 23.4 | 0.1 |
| 8 | 22.00 | 19.4 | 0.2 |
| 9 | 17.00 | 16.7 | 0.3 |
| 10 | 12.00 | 15.3 | 0.3 |
| 11 | 7.00 | 13.1 | 0.3 |
| 12 | 24.50 | 21.1 | 0.1 |
| 13 | 50.00 | 27.4 | 0.3 |
| 14 | 55.00 | 27.2 | 0.2 |
| 15 | 62.50 | 30.1 | 0.4 |
| 16 | 70.00 | 30.0 | 0.9 |
| 17 | 80.00 | 32.5 | * |

What is claimed:

1. A method of controlling pore size in a continuous process for manufacturing porous membranes, comprising, providing two or more polymer solutions wherein the two or more polymer solutions are formed of the same polymer solution, at least two of the two or more solutions have different pre-established Tmax profiles such that a first solution has a low TMax and at least a second solution has a Tmax greater than the first solution, determining the pore size of the membrane that will result under said process for each polymer solution, determining the ratio or proportions of each solution to be blended together to make a homogeneous manufacturing process polymer solution, blending said two or more polymer solutions in the ratio or proportions calculated to obtain a blend of polymer solutions in a manner that affects the final solution properties only by the effect of the ratio or proportions of the two or more polymer solutions and manufacturing membranes with said blend by said continuous process.

2. The method of claim 1 wherein the blending of the two or more solutions is done in an in-line blender.

3. The method of claim 1 further comprising, determining the pore size of said manufactured membrane, calculating an adjustment to the ratio or proportions of said polymer solutions to correct for variation from desired pore size, adjusting the blend of said polymer solutions to reflect the adjusted ratio or proportions, manufacturing membranes with said adjusted blend by said continuous process.

4. The method of claim 3 wherein the two or more solutions are blended in an in-line blender.

5. The method of claims 1 or 3, wherein the two or more polymer solutions are made with one or more semi-crystalline polymers.

6. The method of claim 1 wherein the two or more polymer solutions are made with one or more semi-crystalline polymers and the semi-crystalline polymers are selected from the group consisting of polyamides, polyvinylidene fluoride and cellulose ester.

7. The method of claim 1 wherein the two or more polymer solutions have a lower critical solution temperature.

8. The method of claim 1 further comprising the step of adjusting pore size of the formed membrane by a feedback mechanism.

9. The method of claim 1 further comprising the step of adjusting pore size of the formed membrane by a feed-back mechanism and the feedback mechanism has the steps of converting said measured property or properties into data form suitable to be used in a computer program designed to determine blend ratio or proportions, and transmitting instructions to one or more valves to adjust the ratio or proportions of said polymer solutions during blending.

10. A method of adjusting pore size by a feedback mechanism in a continuous process for manufacturing porous membranes, comprising, providing two or more polymer solutions formed of the same polymer solution, having different, pre-established, TMax profiles such that a first solution has a low TMax and at least a second solution has a Tmax greater than the first solution, determining the pore size of the membrane that will result under said specified process for each polymer solution, measuring one or more properties of the membrane as it is being manufactured, converting said measured property or properties into data form suitable to be used in a computer program designed to determine blend ratio or proportions, and further designed to transmit control signals to means controlling the flow of the polymer solutions into said blend vessel, transmitting instructions to one or more valves to adjust the ratio or proportions of said polymer solutions, blending said two or more polymer solutions in the ratio or proportions so determined to obtain a blend of said polymer solutions in a manner that affects the final solution properties only by the effect of the ratio or proportions of the two or more polymer solutions and manufacturing membranes with said adjusted blend by said continuous process.

11. The method of claim 10 wherein the blending occurs in an in-line blender.

12. The method of claim 10 wherein the polymer solution is made of one or more semi-crystalline polymers.

13. The method of claim 10 wherein the polymer solution is made of one or more semi-crystalline polymers selected from the group consisting of polyamides, polyvinylidene fluoride and cellulose ester.

14. The method of claim 10 wherein the two or more polymer solutions have a lower critical solution temperature.

15. The method of claim 1 wherein there are two solutions, a first solution having a low TMax and a second solution having a Tmax greater than the first solution.

16. The method of claim 10 wherein there are two solutions, a first solution having a low TMax and a second solution having a Tmax greater than the first solution.

17. The method of claim 1 wherein there are more than two solutions, a first solution having a low TMax and at least a second solution having a Tmax greater than the first solution.

18. The method of claim 10 wherein there are more than two solutions, a first solution having a low TMax and at least a second solution having a Tmax greater than the first solution.

19. The method of claim 1 wherein the two or more solutions have a first solution having a low TMax and at least a second solution having a Tmax greater than the first solution and the solution are used on at least one layer of co-cast multiple layered membrane.

20. The method of claim 10 wherein the two or more solutions have a first solution having a low TMax and at least a second solution having a Tmax greater than the first solution and the solution are used on at least one layer of co-cast multiple layered membrane.

* * * * *